(12) United States Patent
Natsuno

(10) Patent No.: US 7,090,131 B2
(45) Date of Patent: Aug. 15, 2006

(54) SINGLE-PASS MAGNETIC READING AND OPTICAL READING APPARATUS AND METHOD

(75) Inventor: Atsushi Natsuno, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/055,425

(22) Filed: Feb. 10, 2005

(65) Prior Publication Data

US 2005/0178834 A1    Aug. 18, 2005

(30) Foreign Application Priority Data

Feb. 16, 2004   (JP)   ............................. 2004-038473
Feb. 16, 2004   (JP)   ............................. 2004-038474

(51) Int. Cl.
G06K 7/08        (2006.01)
G06K 7/00        (2006.01)

(52) U.S. Cl. ........................ 235/449; 235/435; 235/439

(58) Field of Classification Search ................ 235/375, 235/379, 435, 439, 449, 475; 382/140
See application file for complete search history.

(56) References Cited

U.S. PATENT DOCUMENTS

| 5,544,043 | A | * | 8/1996 | Miki et al. |
| 5,789,727 | A | * | 8/1998 | Teradaira et al. |
| 5,965,862 | A | * | 10/1999 | Momose |
| 6,068,187 | A | * | 5/2000 | Momose |
| 6,182,896 | B1 | * | 2/2001 | Momose |
| 6,257,783 | B1 | * | 7/2001 | Hanaoka et al. |
| 6,290,129 | B1 | * | 9/2001 | Momose |
| 6,363,164 | B1 | * | 3/2002 | Jones et al. ................. 382/135 |
| 6,473,519 | B1 | * | 10/2002 | Pidhirny et al. ............ 382/140 |
| 2001/0045452 | A1 | * | 11/2001 | Momose et al. |

FOREIGN PATENT DOCUMENTS

| JP | 7-244702 | * | 9/1995 |
| JP | 09-044673 | | 2/1997 |
| JP | 10-278394 | | 10/1998 |
| JP | 11-7497 | * | 1/1999 |
| JP | 2000-259764 | | 9/2000 |
| JP | 2000-344428 | * | 12/2000 |
| JP | 2003-006173 | | 1/2003 |
| JP | 2003-006551 | * | 1/2003 |

* cited by examiner

Primary Examiner—Thien M. Le
Assistant Examiner—April Taylor
(74) Attorney, Agent, or Firm—Mark P. Watson

(57) ABSTRACT

A document reading apparatus reduces processing time and affords excellent ease of use when reading a slip document to acquire both magnetically read data and image data. Transportation unit 19, 20 convey slips through a transportation path. Magnetic reading unit 21, 22 output magnetically read data acquired by reading the printed magnetic ink characters from the slip as the slip passes through the transportation path, and optical reading unit 23, 24 output image data captured by optically imaging the same slip during the same pass through the transportation path. A control unit 11 interprets control commands and controls slip transportation, the magnetic reading process, and the optical reading process accordingly. A single-pass multiple-reading command controls executing a single-pass multiple-reading process for applying both the magnetic reading and optical reading of specified slip during a single pass through the transportation path.

16 Claims, 8 Drawing Sheets

Selecting type of reading process

| Type of reading process | Value (1 bit) | |
|---|---|---|
| | 0 | 1 |
| magnetic reading process | not selected | selected |
| optical reading process | not selected | selected |

Read result of single-pass multiple-reading process

| Function | Value (1 bit) | |
|---|---|---|
| | 0 | 1 |
| MICR read result | normal | error |
| Image read result | normal | error |

SINGLE-PASS MAGNETIC READING AND OPTICAL READING APPARATUS AND METHOD

BACKGROUND OF THE INVENTION

1. Field of the Invention

The present invention relates to a document reading apparatus, hybrid processing apparatus, document reading processing system, and document reading processing method for reading small pieces of paper (i.e. slips) on which magnetic ink characters and image data are printed. "Image data" as referred to herein generally unit text, graphics and images that are printed on paper by laser, ink-jet, dot-matrix, etc. printing.

2. Description of the Related Art

Slips such as checks have conventionally had essential information such as the bank, account number, and even check amount information printed on the front of the check in magnetic ink. Whether or not a check is valid and can be used is typically determined by reading the magnetic ink information with a document reader that can read the magnetic ink characters while conveying the check or other slip through a document transportation path. In addition to reading magnetic ink characters, demand has also grown for document readers that can optically scan the surface of the entire check and store the scanned check image as image data. This demand has led to the development of document reading apparatuses (hybrid processing apparatuses) that execute both magnetic reading and optical reading processes. See, for example, Japanese Unexamined Patent Appl. Pub. 2003-6713.

In general, a slip reading apparatus such as described above is connected to and communicates with a host device over a network, a serial communication bus, or USB communication channel, for example, to form a document reading processing system for processing checks and other slips. The operation of the document reading apparatus is controlled by specific control commands received from the host device. When a desired slip is read with this document reading apparatus, the host device controls operation by, for example, first sending a control command to read the magnetic ink characters and receive the resulting magnetic ink character data, and then sending a control command to optically read the image on the slip and receive the resulting image data.

To control document reading apparatus operation from the host device as described above, however, the slip must first be loaded and transported in order to read the magnetic ink characters, and then must be loaded again and transported a second time for optical reading. The host device must therefore wait to sequentially acquire the necessary magnetic ink character data and image data. This operation is complicated and inefficient and ease of use is thus poor. The host device also cannot determine the operating condition of the document reading apparatus, and unnecessary reading operations may therefore also be run.

The present invention is therefore directed to solving the foregoing problems, and an object of the invention is to provide a document reading apparatus, method, and document reading processing system whereby both magnetic ink character data and image data can be read and captured from a slip document during a single pass through the transportation path, thus making complicated operation unnecessary, shortening the time required for document reading, and thereby providing excellent convenience and ease of use.

SUMMARY OF THE INVENTION

To achieve the foregoing object, a document reading processing system according to the present invention has a document reading apparatus for reading a slip on which magnetic ink characters are printed, the document reading apparatus being connected via a network to a host device for operating the document reading apparatus. The document reading apparatus has a transportation unit that conveys the slip through a transportation path; a magnetic reading unit that magnetically reads the printed magnetic ink characters from the slip in the transportation path and outputs magnetic ink character recognition (MICR) data; an optical reading unit that optically reads an image of the slip in the transportation path and outputs image data; and a control unit that controls the transportation unit, the magnetic reading unit, and the optical reading unit, according to a command from the host device. The host device has a command unit that instructs the document reading apparatus to magnetically read magnetic ink characters and optically read an image from a specific slip during a single pass of the slip through the transportation path, and to transmit a read result to the host device; and a read data storage unit that stores MICR and image data transmitted from the document reading apparatus correlated to the specific slip that was read.

When the single-pass multiple-reading process is executed by the document reading apparatus in response to a command from the host device, the magnetic reading is executed by the magnetic reading unit and the optical reading is run by the optical reading unit while the slip to be processed is transported once through the transportation path, thus acquiring both magnetically read data and image data in a single pass of the document. Operation of the document reading apparatus is thus simple, and the time required to read and process a slip can be reliably shortened.

Furthermore, the document reading apparatus can send the magnetically read data or image data to the host device when the host device requests the read data, and the read data can thus be sequentially stored linked to a particular slip in a data storage device. Data read from a particular slip can thus be quickly confirmed at one time.

Preferably, the control unit of the document reading apparatus generates data for identifying whether the magnetic reading and optical reading ended normally or in error as the read result of the single-pass multiple-reading, and returns the read result to the host device that sent the single-pass multiple-reading command.

When the host device instructs the document reading apparatus to run the single-pass multiple-reading process, information indicating the result of the process is generated and returned to the host device. The host device can thus identify whether the process ended normally or ended due to an error based on this returned information. User convenience can thus be yet further improved by running the process suited to the current status.

In a document reading processing system according to another aspect of the invention, the control unit of the document reading apparatus interprets control commands received from the host device and controls operation according to the interpreted commands. The command unit of the host device sends as control commands to the document reading apparatus a single-pass multiple-reading command instructing execution of both magnetic reading and optical reading in a single pass of the slip through the transportation path, a magnetically read data transmission command instructing transmission of the t MICR to the host, and an image data transmission command instructing transmission of the image data to the host.

The host device can thus easily control the document reading apparatus to execute specific operations according to the combination of control commands applied to the document reading apparatus. The sequence of operations applied to a particular slip can also be easily and freely controlled by combining the single-pass multiple-reading command, magnetically read data transmission command, and image data transmission command appropriately.

In a document reading processing system according to another aspect of the invention, the command unit of the host device adds to the single-pass multiple-reading command a parameter for selectively specifying the magnetic reading process or the optical reading process as the type of reading process to apply to the slip during one pass through the transportation path; and the control unit of the document reading apparatus selectively executes only the reading process selectively specified by said parameter in the single-pass multiple-reading process.

Processing time can thus be shortened and energy consumption can be reduced when the host device needs the magnetically read data or the image data because the host device can set a parameter to selectively specify the required data for a particular slip, thus preventing the document reading apparatus from executing unnecessary processes.

In a document reading processing system according to another aspect of the invention, the optical reading unit of the document reading apparatus has a first optical reading unit for imaging the front side of the slip and outputting the front image data, and a second optical reading unit for imaging the back side of the slip and outputting the back image data; a parameter for selectively specifying whether image data for the front or image data for the back of the read slip is to be read is added to the image data transmission command; and the control unit of the document reading apparatus selectively transmits only image data for the side selectively specified by the parameter in the image data transmission process.

The host device can thus set a parameter to selectively specify which side of the slip to read when image data is needed for only one side of the processed slip, thereby reducing the load on the image scanning process in the document reading apparatus, shortening the processing time, and saving energy.

In a document reading processing system according to another aspect of the invention, the command unit of the host device sends the magnetically read data transmission command or image data transmission command to the document reading apparatus only when the reading process is determined to have ended normally based on the returned read result.

When the host device sends a magnetically read data transmission command or image data transmission command after the single-pass multiple-reading command to the document reading apparatus, the host device can control the document reading apparatus to send only read data for slips that were processed normally. Unnecessary communication processes are thus stopped from running, and processing time can be greatly reduced.

In a document reading processing system according to another aspect of the invention, the host device runs a specific error process when the reading process is determined to have ended in error based on the returned read result.

Because the host device applies a specific error handling process to a slip if the slip reading process ended due to an error when the host device sends the magnetically read data transmission command or image data transmission command after the single-pass multiple-reading command to the document reading apparatus, problems occurring when reading a desired slip can be reliably reported.

In a document reading processing system according to another aspect of the invention, the control unit of the document reading apparatus returns status data to the host device in the magnetically read data transmission process when the magnetic reading process generates an error and ends processing for a specified slip, the status data indicating a cause of the error, and returns status data to the host device in the image data transmission process when the optical reading process generates an error and ends processing for a specified slip, the status data indicating a cause of the error. The host device then runs an error handling process according to the content of the received status data.

When the host device sends a magnetically read data transmission command or image data transmission command following the single-pass multiple-reading command to the document reading apparatus, the document reading apparatus returns status data about an error if processing the specified slip ended due to an error. The host device can therefore reference this error status data to reliably detect that a problem occurred during slip processing and the cause of the problem, and thus run an appropriate error handling process.

A document reading apparatus according to a further aspect of the invention for reading slips on which magnetic ink characters are printed has a transportation unit that conveys the slip through a transportation path; a magnetic reading unit that magnetically reads the printed magnetic ink characters from the slip in the transportation path and outputs magnetic ink character recognition (MICR) data; an optical reading unit that optically reads an image of the slip in the transportation path and outputs image data; and a control unit that interprets an input control command, and based on the interpreted control command, controls the transportation unit, the magnetic reading unit, and the optical reading unit. The control command contains a single-pass multiple-reading command to magnetically read magnetic ink characters and optically read an image from a specific slip during a single pass of the slip through the transportation path.

When a single-pass multiple-reading command is input to read a particular slip, the slip is read by the magnetic reading process of the magnetic reading unit and the optical imaging process of the optical reading unit, and both magnetically read data and optically scanned image data can thus be output, with a single pass of the slip through the transportation path. Complicated operation of the document reading apparatus is thus not needed, and the time required to read and process a document slip can thus be reliably shortened.

A document reading apparatus according to a further aspect of the invention adds a parameter for selectively specifying the magnetic reading process or the optical reading process as the type of reading process to apply to the slip during one pass through the transportation path to the single-pass multiple-reading command. The control unit then selectively executes only the reading process selectively specified by said parameter in the single-pass multiple-reading process.

By thus adding a parameter to the single-pass multiple-reading command for selectively specifying execution of the magnetic reading process or optical reading process, processing time can be further shortened by selecting only one reading process when magnetically read data or image data has already been captured for the slip.

In a document reading apparatus according to a further aspect of the invention, the control unit generates and outputs data for identifying whether the magnetic reading process and optical reading process respectively ended normally or in error as a read result of the single-pass multiple-reading process.

This aspect of the invention generates and outputs information indicating the read result of the single-pass multiple-reading process, and whether reading ended normally or in error can be determined from this information. User convenience and ease of use are thus improved because the host device can therefore reference the read result to run an error handling process or other process appropriate to the situation.

In a document reading apparatus according to a further aspect of the invention, the optical reading unit of the document reading apparatus contains a first optical reading unit for reading the front side of the slip and outputting front image data, and a second optical reading unit for reading the back side of the slip and outputting back image data.

By outputting image data for both the front and back sides of the slip being read, this aspect of the invention can acquire a wide range of other information complementing the magnetically read data, and thus improves the utility value of the processed slip.

A hybrid processing apparatus according to a further aspect of the present invention has a document reading apparatus as described above, and a printing unit for printing on the slip with a print head. The control unit of the document reading apparatus controls the printing operation of the printing unit based on a control command.

A document reading processing method according to a further aspect of the invention for reading a slip on which magnetic ink characters are printed, comprises: receiving a single-pass multiple-reading command from a host device; interpreting the single-pass multiple-reading command; and in response to the single-pass multiple-reading command, magnetically reading the printed magnetic ink characters from the slip and optically reading an image of the slip in a single pass of the slip through a slip transportation path, and outputting a read result.

A document reading processing method according to a further aspect of the invention also has a step of generating and outputting data for identifying whether the magnetic reading process and optical reading process respectively ended normally or in error as the read result of the single-pass multiple-reading command.

When a parameter is added to the single-pass multiple-reading command is determined to be a parameter for selectively specifying the magnetic reading process or the optical reading process as the type of reading process to apply to the slip during one pass through the transportation path, a document reading processing method according to another aspect of the invention selectively executes only the reading process selectively specified by the parameter.

A document reading apparatus according to this invention thus provides a magnetic reading unit and an optical reading unit for reading a slip document, and a control unit for executing both the magnetic reading process and optical reading process during a single document transportation operation. This document reading apparatus thus requires less time to acquire both magnetically read data and optically read data from a desired slip document, acquires both magnetic and optical data without requiring the operator to repeatedly handle the document, and thus provides excellent convenience and ease of use.

A document reading processing system according to this invention thus provides a magnetic reading unit and an optical reading unit for reading a slip document, a control unit for executing both the magnetic reading process and optical reading process during a single document transportation operation, and sends the magnetically read data and image data captured from the processed slip document to the host device. This document reading processing system thus reliably reduces overall processing time without repeatedly handling each document, and thus provides excellent convenience and ease of use.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A hybrid processing apparatus and a host device are described by way of example below according to preferred embodiments of the present invention, described first below with reference to FIG. 1 and FIG. 2.

A hybrid processing apparatus provides the functions of two devices in a single unit. More specifically, this hybrid processing apparatus provides the functions of a document reading apparatus that reads both magnetic ink characters and image data from a check or other slip document (simply "slip" below), and performs the functions of a printer for printing on the same slip. The present invention does not, however, require the functions of a printer, and is directed more particularly to the function of the document reading apparatus.

Figure 1:
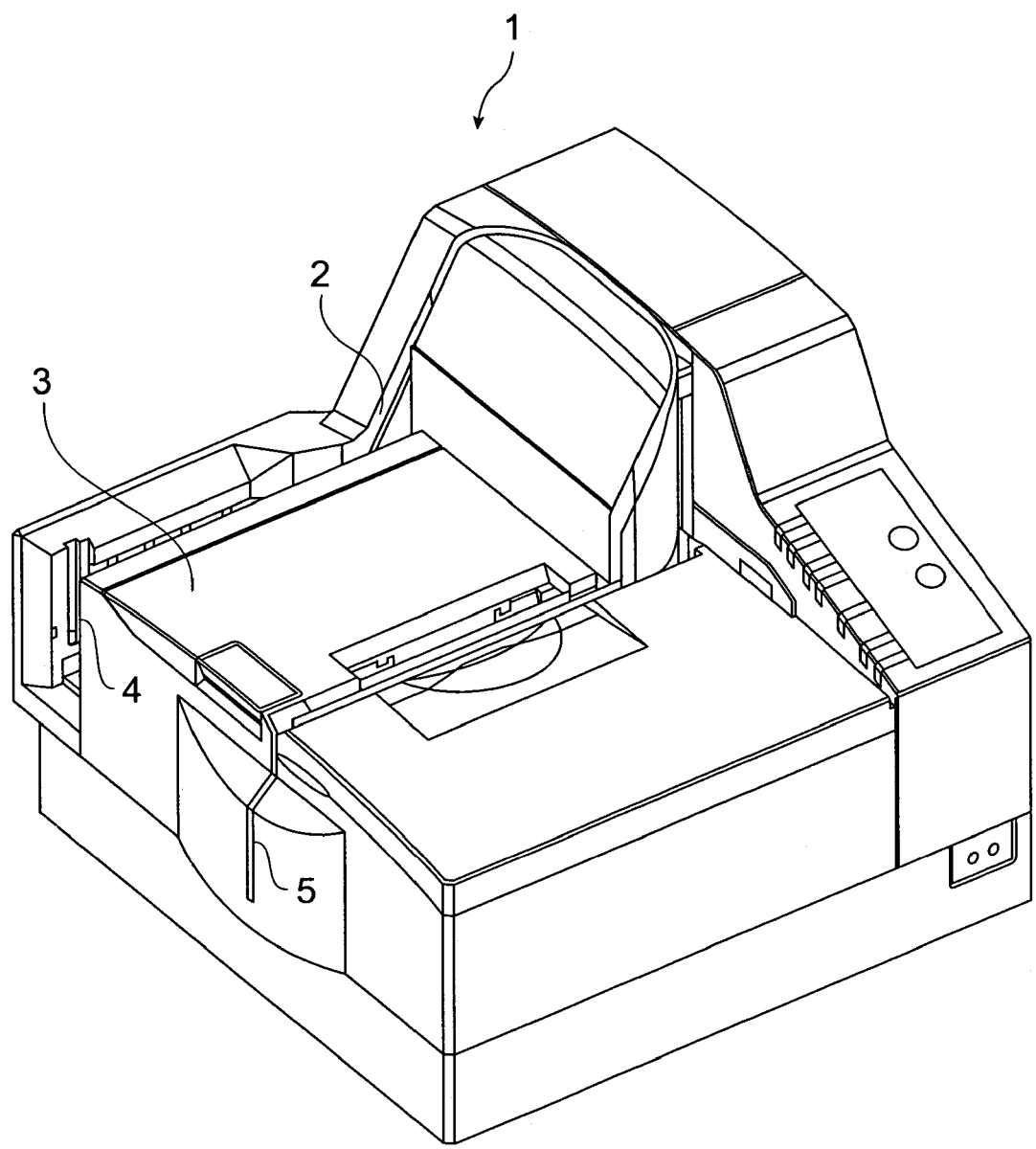
FIG. 1 is an oblique view of the exterior of a hybrid processing apparatus according to a preferred embodiment of the invention.
Figure 2:
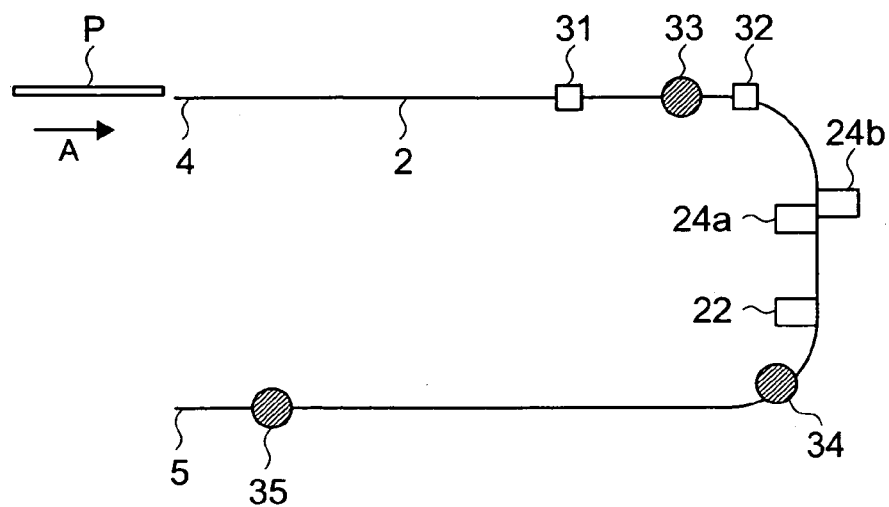
FIG. 2 schematically shows the transportation path in a hybrid processing apparatus according to a preferred embodiment of the invention.

FIG. 1 is an oblique view showing the exterior of a hybrid processing apparatus 1 according to the present invention, and FIG. 2 schematically shows the slip transportation path in this hybrid processing apparatus 1.

As shown in FIG. 1, a hybrid processing apparatus 1 according to this embodiment of the invention has a U-shaped (FIG. 2) transportation path 2 for conveying a check or other slip. A cover 3 covers the top part of this hybrid processing apparatus 1 along the transportation path 2. Checks and other slips are manually inserted into the transportation path 2 from a loading slot 4, and are discharged from an exit 5 at the other end of the transportation path.

FIG. 2 shows parts related to reading a slip P along the transportation path 2 from the loading slot 4 to the exit 5. A line of MICR (magnetic ink character recognition) text containing, for example, the user's account number, serial check number, and other information encoded in magnetic ink characters is printed at a specified position on the front of the slip P. Magnetic ink characters thus printed on a slip P can be read by extracting the magnetic waveform pattern of the magnetic ink characters using an MICR head further described below, and then interpreting the resultant magnetic signal.

As shown in FIG. 2, a slip P inserted to the loading slot 4 is sequentially conveyed in the direction of arrow A by first transportation roller 33 and then second transportation roller 34, and is then discharged by the discharge roller 35 from the paper exit 5. As the slip P is conveyed through the transportation path 2, the document is read according to the position of the slip detected by a BOF (bottom of form) sensor 31 and TOF (top of form) sensor 32.

The slip P is optically read using the front CIS mechanism 24a and back CIS mechanism 24b contained in the CIS (contact image sensor) mechanism further described below, and is magnetically read using an MICR head 22. The front and back sides of a slip P traveling through the transportation path 2 are first optically read by the front CIS mechanism 24a and back CIS mechanism 24b, respectively, and then the magnetic ink characters printed on the front of the slip P are read by the MICR head 22.

Figure 3:
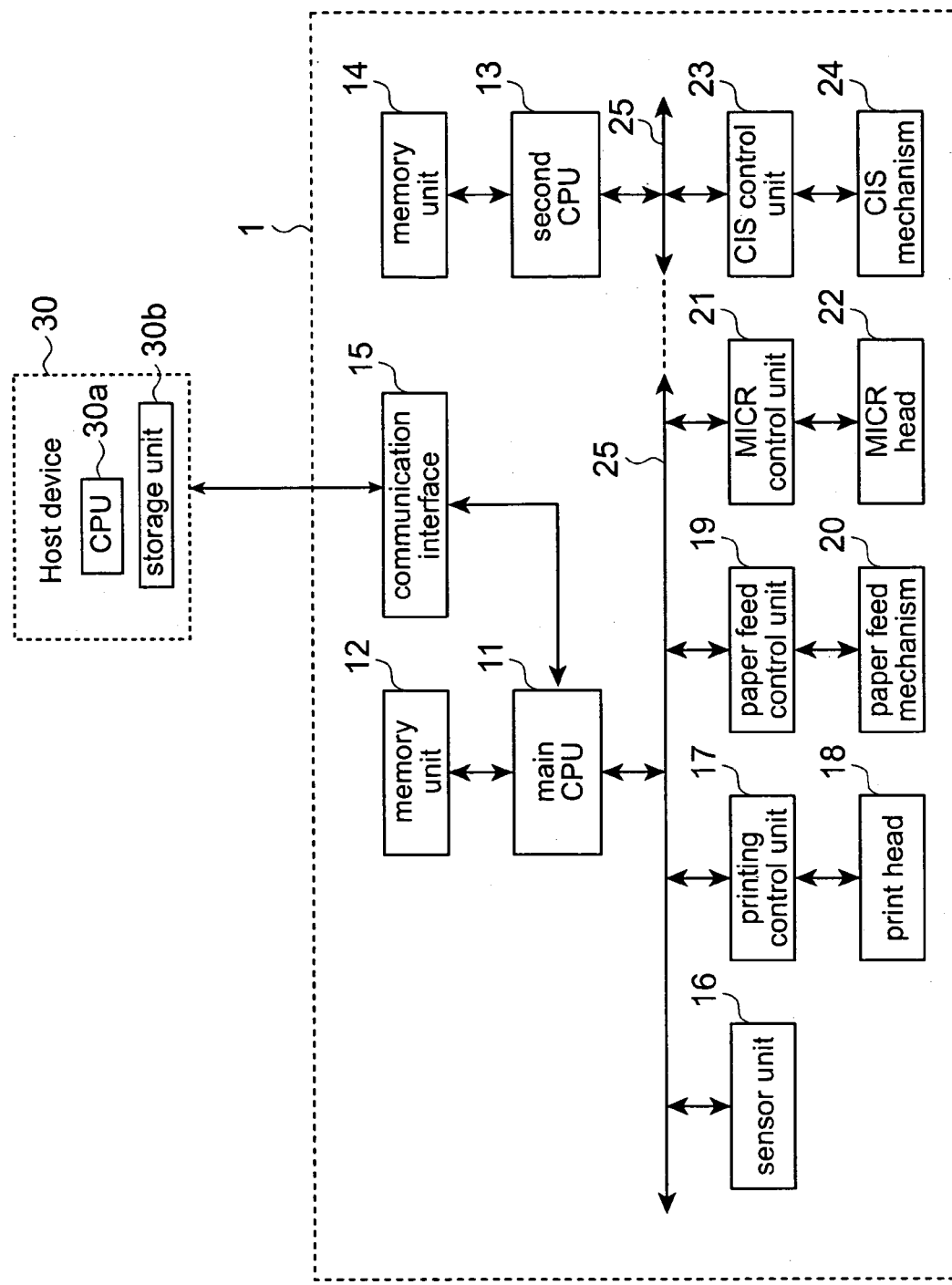
FIG. 3 is a block diagram showing the hardware configuration of a hybrid processing apparatus according to a preferred embodiment of the invention.

FIG. 3 is a block diagram showing the hardware arrangement of this hybrid processing apparatus 1. As shown in FIG. 3, this hybrid processing apparatus 1 has two CPUs, specifically a main CPU 11 handling overall control of the apparatus, and a second CPU 13 for handling primarily the optical reading. A dedicated second CPU 13 is provided for optical data processing because optical scanning is generally processor intensive.

The main CPU 11, which functions as the control unit, runs a desired process using memory unit 12, which contains RAM and ROM, and exchanges control signals and other information with the MICR control unit 21, paper feed control unit 19, printing control unit 17, and sensor unit 16 connected thereto by an internal bus 25.

The second CPU 13 runs the optical imaging process using another memory unit 14, which contains ROM and RAM, and exchanges control signals and data with the CIS control unit 23 connected thereto via the internal bus 25. The main CPU 11 and second CPU 13 are not interconnected via the internal bus 25, but instead communicate through a dedicated port.

The host device 30 is connected to the hybrid processing apparatus 1 over a network. When a specific control command is sent to the hybrid processing apparatus 1 as a function of an application program running on the host device 30, the control command is received from the network by the communication interface 15 and passed to the main CPU 11. The main CPU 11 then analyzes the control command, and controls other parts of the hybrid processing apparatus according to the interpreted control commands. A process run by the main CPU 11 also sends data read from the slip P through the communication interface 15 over the network to the host device 30. This host device 30 includes a CPU 30a that functions as the command unit to control executing a control command transmission process, and has a storage unit 30a that stores data received from the hybrid processing apparatus 1.

The sensor unit 16 contains a variety of sensors disposed for detecting the operating status of the hybrid processing apparatus 1. These sensors include, for example, the BOF sensor 31 and TOF sensor 32 positioned along the transportation path 2, and a sensor for detecting whether the cover of the hybrid processing apparatus 1 is open or closed. Detection signals from the sensors of this sensor unit 16 are output at according to a specific timing to the main CPU 11.

The printing control unit 17 controls driving the print head 18 to print desired print data on a slip P as instructed by the main CPU 11. The print head 18 prints a pattern corresponding to the print data on the slip P as the slip P is conveyed passed the print head 18. The printing control unit 17 and print head 18 together function as a printing unit.

The paper feed control unit 19 drives the paper feed mechanism 20 that contains a motor and rollers as controlled by the main CPU 11 to convey a slip P from the loading slot 4 to the exit 5. Note that the main CPU 11 can appropriately change the transportation speed of the slip P by the paper feed mechanism 20. The paper feed control unit 19 and paper feed mechanism 20 together function as the transportation unit.

The MICR control unit 21 drives the MICR head 22 as instructed by the main CPU 11 to read the magnetic ink characters printed on the slip P and extract a magnetic signal and generate resultant data corresponding to the pattern of the magnetic ink characters. The location of the magnetic ink characters read by the MICR head 22 can be determined from the position of the slip P detected by the sensor unit 16 while the slip P is transported. The MICR control unit 21 and MICR head 22 together function as the magnetic reading unit.

The CIS control unit 23 drives the CIS mechanism 24 as instructed by the CIS control unit 23 to optically scan or read the front and back sides of the slip P and extract an image signal generate resultant data representing images on the slip P. The area that is scanned by the CIS mechanism 24 can be determined from the position of the slip P detected by the sensor unit 16 as the slip P is conveyed through the transportation path 2. This CIS mechanism 24 has a front CIS mechanism 24a and back CIS mechanism 24b as described above, and these scanning mechanisms can be individually controlled. The CIS control unit 23 and CIS mechanism 24 together function as the optical reading unit.

The process whereby the hybrid processing apparatus 1 according to the present invention reads a slip P is described in detail below with reference to FIG. 4 to FIG. 8. The slip P reading processes described below are a magnetic reading process for reading by unit of the MICR control unit 21 and MICR head 22, and an optical reading process for reading by unit of the CIS control unit 23 and CIS mechanism 24.

Figure 4:
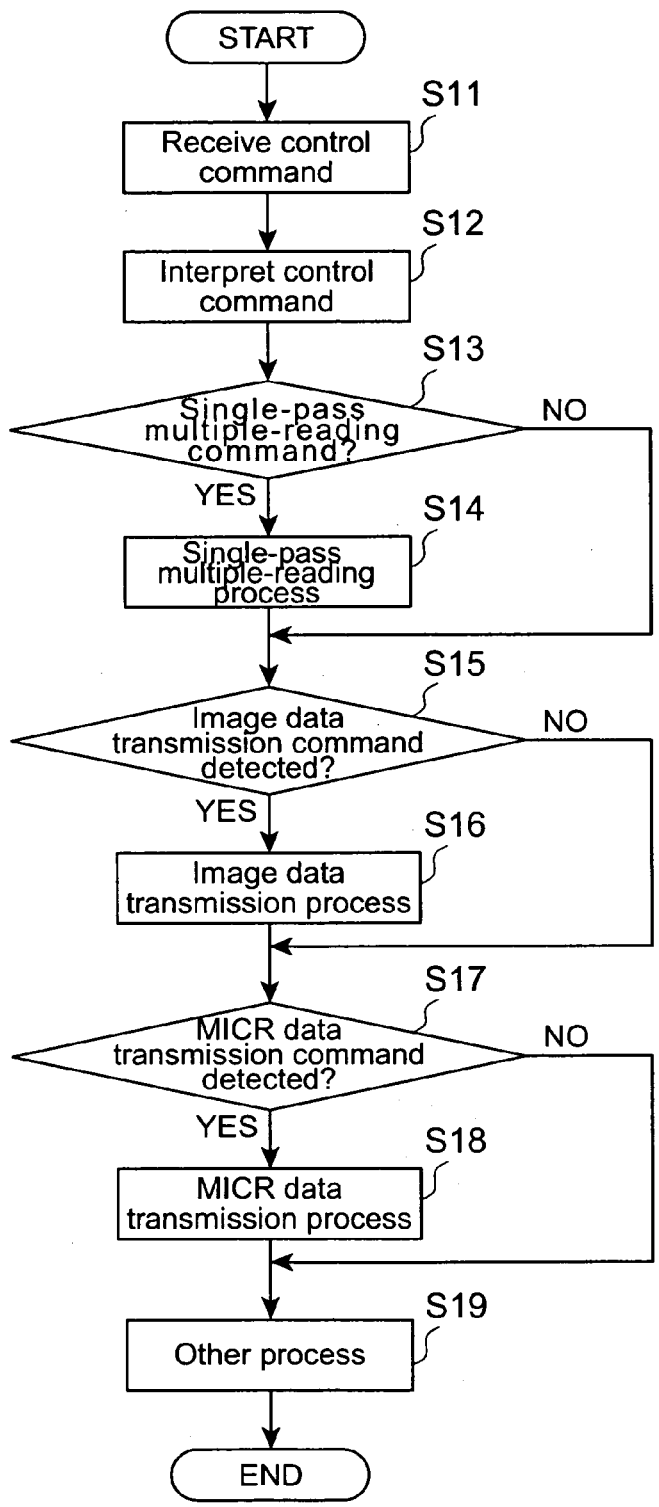
FIG. 4 is a flow chart of the control command receiving process executed by a hybrid processing apparatus according to a preferred embodiment of the invention.

The control command receiving process executed by the hybrid processing apparatus 1 is described first with reference to the flow chart thereof in FIG. 4. A function of the application program run by the host device 30 sends a particular control command before the control command receiving process shown in FIG. 4 runs. The control command sent from the host device 30 is received through the communication interface 15 (step S11). The main CPU 11 interprets the received control command (step S12) to determine the type of control command and extract any additional information sent with the command.

If the received control command is determined in step S12 to be a single-pass multiple-read command (step S13 returns yes), the main CPU 11 controls execution of a single-pass multiple-reading process (step S14). On the other hand, if the received control command is not a single-pass multiple-read command (step S13 returns no), control passes to step S15.

The single-pass multiple-reading process executed in step S14 is a process for reading magnetic ink characters and optically reading the image on the slip during a single transportation operation, that is, during a single pass of the slip through the transportation path 2. It is started in response to a single-pass multiple-read read command sent from the host device 30.

This single-pass multiple-reading process is described in detail below.

If the received control command is determined in step S12 to be an image data transmission command (step S15 returns yes), the main CPU 11 controls executing an image data transmission command (step S16). If the received control command is not an image data transmission command (step S15 returns no), control passes to step S17.

The image data transmission process in step S16 retrieves image data captured from a specific slip P from memory unit 14, and sends the image data to the host device 30. This image data is resultant data that is the result of optical reading of the specific slip P slip previously performed by the hybrid processing apparatus 1 and stored in memory unit 14. The image data transmission process is started in response to an image data transmission command sent from the host device 30.

The image data transmission process is also described in detail below.

If the received control command is determined in step S12 to be an MICR data transmission command (step S17 returns yes), the main CPU 11 controls execution of the MICR data transmission process (step S18). If the received control command is not an MICR data transmission command (step S17 returns no), control passes to step S19.

The MICR data transmission process executed in step S18 reads the MICR data from memory unit 12, and sends the MICR data to the host device 30. This MICR data is resultant data that is the result of the magnetic reading of the specific slip P previously performed by the hybrid processing apparatus 1 and stored to the memory unit 12. The MICR data transmission process is started in response to a MICR data transmission command sent from the host device 30.

If the received control command is determined in step S12 to be some other control command, the process called by that control command is executed (step S19), and the process shown in FIG. 4 ends. Description of control commands other than the three control commands noted above is omitted in this embodiment of the invention.

Figure 5:
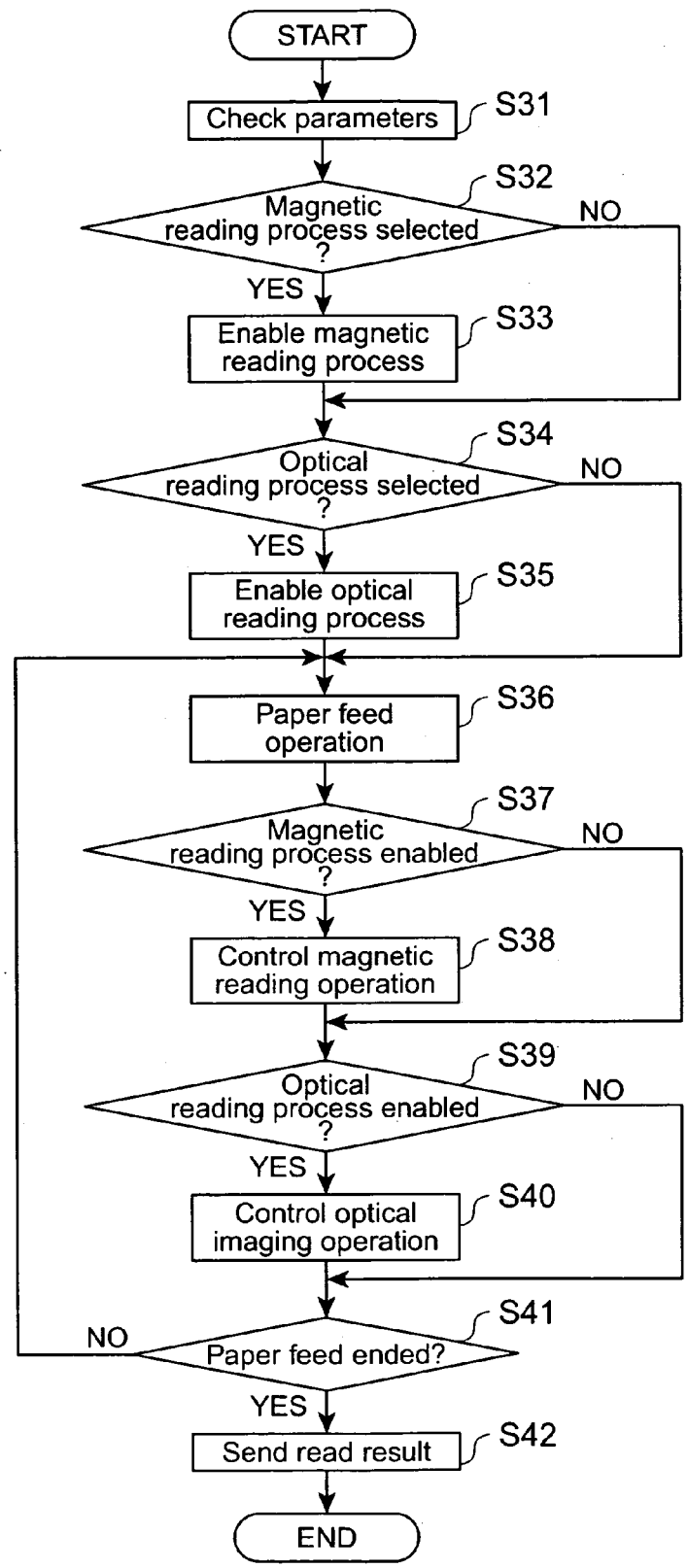
FIG. 5 is a flow chart of the single-pass multiple-reading process executed as step S14 in FIG. 4.

FIG. 5 is a flow chart of the single-pass multiple-reading process executed as step S14 in FIG. 4.

As shown in FIG. 5, the main CPU 11 checks the parameters added to the received single-pass multiple-reading command (step S31). These parameters include a data ID appended to each processed slip P. Reading the data ID thus enables identification of the read slip P. If a specific slip P can be identified by other unit, this data ID can be processed as a constant value. A parameter for selecting the type of reading process to execute is another important parameter that is added to the single-pass multiple-reading command.

Figures 6, 7, 8:
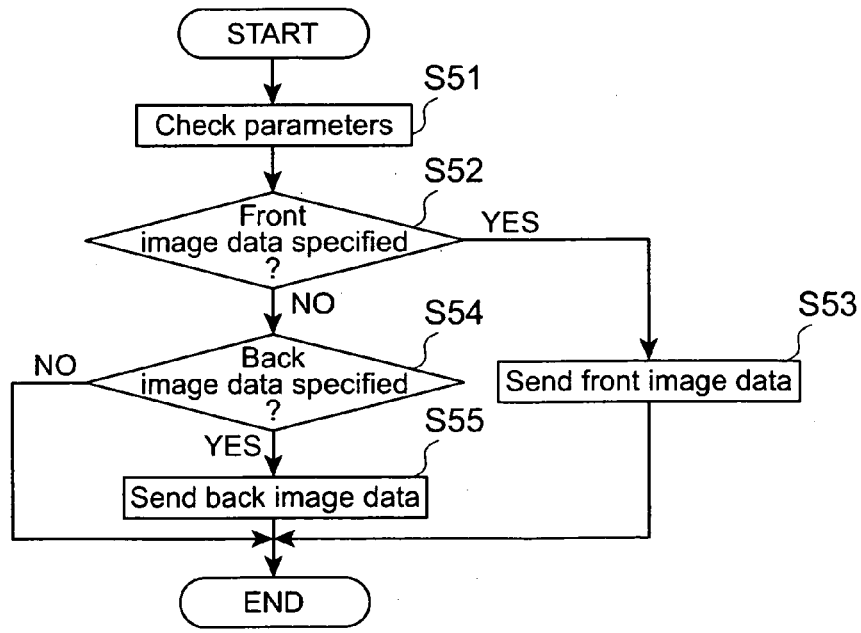
FIG. 6 describes the parameter data added to the single-pass multiple-reading command for selecting the type of reading process to execute.
FIG. 7 describes the content of the read result sent in step S42 in FIG. 5.
FIG. 8 is a flow chart of the image data transmission process run in step S16 in FIG. 4.

FIG. 6 shows the parameters added to the single-pass multiple-reading command for selecting the type of reading process. As shown in FIG. 6, one bit each is allocated to the magnetic reading process and the optical reading process so that both processes can be individually selected or not selected. The host device 30 can thus select both the magnetic reading process and the optical reading process, and can select only the magnetic reading process or only the optical reading process.

If the result of the parameter check in step S31 is that the magnetic reading process is selected (step S32 returns yes), the magnetic reading flag is set to enable the magnetic reading process (step S33). If the magnetic reading process is not selected (step S32 returns no), step S33 is skipped and does not execute.

If the result of the parameter check in step S31 is that the optical reading process is selected (step S34 returns yes), the optical reading flag is set to enable the optical reading process (step S35). If the optical reading process is not selected (step S34 returns no), step S35 is skipped and does not execute.

Note that the process shown in FIG. 5 starts with the magnetic reading flag and optical reading flag not being set, that is, cleared to the disabled state.

The main CPU 11 then applies a command to the paper feed control unit 19 to drive the paper feed mechanism 20 in order to transport the slip P inserted to the hybrid processing apparatus 1, and thus start conveying the slip P referenced to the detection signals from the sensor unit 16 (step S36).

If the magnetic reading flag is set to enable (step S37 returns yes), the main CPU 11 sends a command to the MICR control unit 21 to drive the MICR head 22, and thus controls magnetically reading the slip P (step S38). Magnetic ink characters printed on a specific area of the slip P are read based on detection signals from the sensor unit 16 in step S38.

If the magnetic reading flag is set to the disabled state (step S37 returns no), step S38 does not execute.

If the optical reading flag is set to enable (step S39 returns yes), the second CPU 13 sends a command to the CIS control unit 23 to drive the CIS mechanism 24, and thus controls optically reading the slip P (step S40). Step S40 reads specific areas on the front and back sides of the slip P based on detection signals from the sensor unit 16. If the optical reading flag is set to the disabled state (step S39 returns no), step S40 does not execute.

When transportation of the slip P ends (step S41 returns yes), control goes to step S42. However, steps S36 to S41 repeat while slip P transportation continues (step S41 returns no). If step S41 detects that slip P transportation has ended, all required MICR data has been stored in memory unit 12 and all required image data has been stored in memory unit 14.

The read result, that is, information identifying whether the result of the single-pass multiple-reading process is normal or an error has occured, is then generated and sent to the host device 30 from the communication interface 15 (step S42). The operation shown in FIG. 5 then ends.

FIG. 7 show the content of the read result transmitted in step S42. As shown in FIG. 7, one bit each is allocated to the MICR read result and the optical read result as the result of the single-pass multiple-reading process, and each bit can be set separately to indicate whether the corresponding process ended normally or ended due to an error. Note that termination of a reading operation in the single-pass multiple-reading process due to an error can normally be determined based on the detection result from the sensor unit 16.

FIG. 8 is a flow chart of the image data transmission process executed as step S16 in FIG. 4. When an image data transmission command is received, the main CPU 11 checks the parameters added to the received image data transmission command as shown in FIG. 8 (step S51). These parameters include a data ID that can be read to identify the read slip P.

An image data selection parameter for selecting whether to read the front or the back of the slip P is set in the image data transmission command. As a result, each execution of the image data transmission process in this embodiment of the invention transmits image data for only the front side or only the back side of the slip P as specified by this parameter.

If based on the result of step S51 this image data selection parameter is set to retrieve image data for the front of the slip P (step S52), the front image data matching the specified data ID is selected and read from the image data stored in the memory unit 14, and then sent through the communication interface 15 to the host device 30 (step S53).

If this image data selection parameter is not set to the front image data (step S52 returns no) and is set to the back image data (step S54 returns yes), the back image data matching the specified data ID is selected and read from the image data stored in the memory unit 14, and then sent through the communication interface 15 to the host device 30 (step S55). The process shown in FIG. 8 then ends.

If the optical reading process ends in error, the status data stored in RAM in the memory unit 12 is sent to the host device 30 in step S53 or S55. The host device 30 can then reference this status data to determine the cause of the error in the image reading operation.

The MICR data matching the data ID is also read from memory unit 12 in the MICR data transmission process run as step S18 in FIG. 4, and is sent through the communication interface 15 to the host device 30. If the magnetic reading process ended in error, the status data stored in the memory unit 12 is sent to the host device 30. The host device 30 can then reference this status data to determine the cause of the error during the magnetic reading operation.

Figure 9:
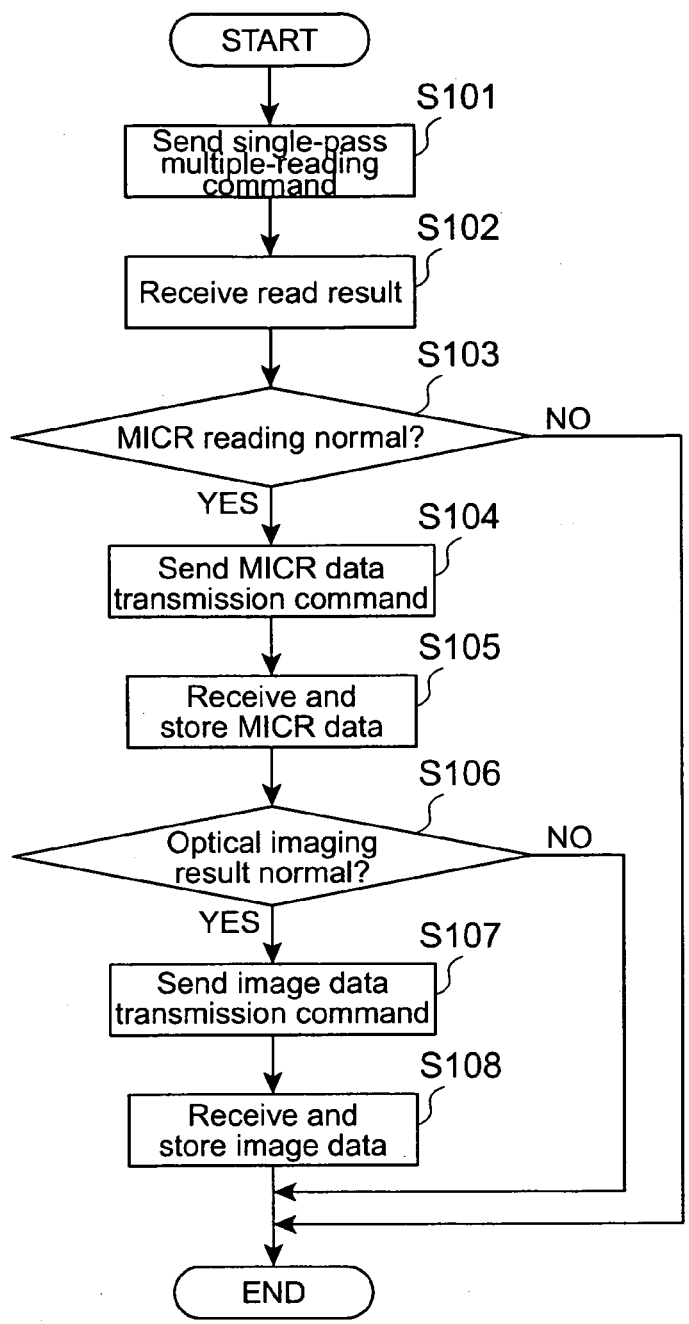
FIG. 9 is a flow chart of a first process executed by the host device.
Figure 10:
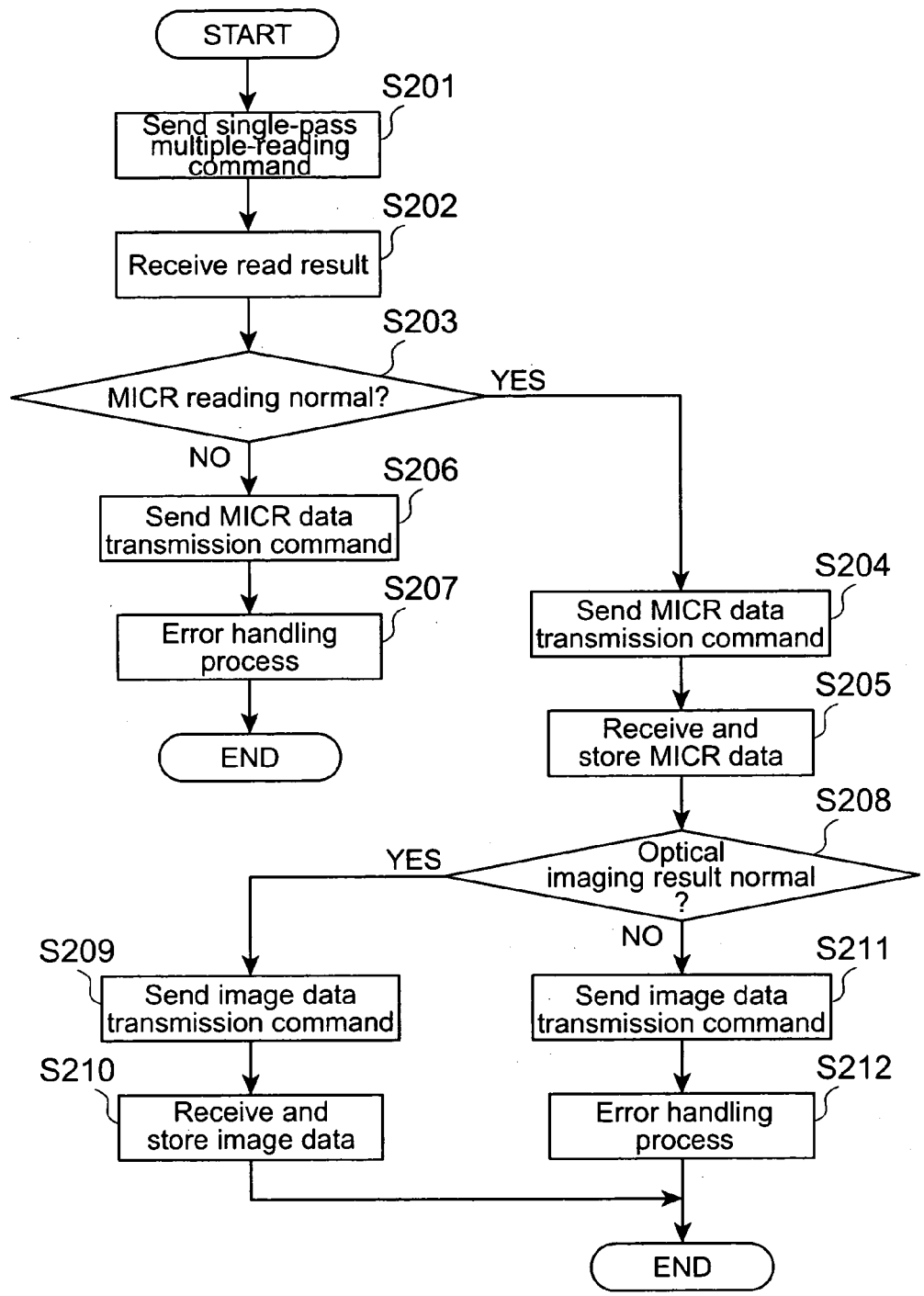
FIG. 10 is a flow chart of a second process executed by the host device.

A process run by a host device 30 using this hybrid processing apparatus 1 is described next. The host device 30 can execute a variety of processes using the hybrid processing apparatus 1 depending upon the functions of the application program, and two typical processes are described below. FIG. 9 is a flow chart of a first process executed by the host device 30, and FIG. 10 is a flow chart of a second process executed by the host device 30.

The first process shown in FIG. 9 sequentially executes the single-pass multiple-reading command, the MICR data transmission command, and the image data transmission command. The host device 30 first sends the single-pass multiple-reading command to the hybrid processing apparatus 1 at a specific time (step S101). The data ID of the slip P to be read is added to the single-pass multiple-reading command as a parameter. The process described in FIG. 9 further assumes that both the magnetic reading process and optical reading process are indicated by parameters as the type of reading process executed in this single-pass multiple-reading process.

When the single-pass multiple-reading command is received, the hybrid processing apparatus 1 runs the single-pass multiple-reading process shown in FIG. 5, and the host device 30 thus receives the read result returned from the hybrid processing apparatus 1 as shown in step S42 in FIG. 5 (step S102).

If the magnetic reading process ended normally (step S103 returns yes) based on the MICR read result contained in the read result received in step S102, the host device 30 sends a MICR data transmission command to the hybrid processing apparatus 1 (step S104). When the hybrid processing apparatus 1 receives the MICR data transmission command, the hybrid processing apparatus 1 runs the MICR data transmission process. As a result, the host device 30 receives and sequentially stores the MICR data from the hybrid processing apparatus 1 in storage device 30b (step S105).

However, if the magnetic reading process ended in error (step S103 returns no) based on the MICR read result contained in the read result received in step S102, the host device 30 stops reading the slip P and the process shown in FIG. 9 ends.

If the optical reading process ended normally (step S106 returns yes) based on the image data read result contained in the read result received in step S102, the host device 30 sends an image data transmission command to the hybrid processing apparatus 1 (step S107). When the hybrid processing apparatus 1 receives the image data transmission command, the hybrid processing apparatus 1 runs the image data transmission process. As a result, the host device 30 receives and sequentially stores the image data from the hybrid processing apparatus 1 in storage device 30b (step S108).

However, if the optical reading process ended in error (step S106 returns no) based on the image data read result received in step S102, steps S107 and S108 do not execute and the process shown in FIG. 9 ends.

The image data transmission command sent in step S107 must indicate whether to retrieve the front or the back image data. To get the image data for both front and back sides of the slip P, steps S107 and S108 must be executed twice with this parameter set to separately specify the front and back sides.

The MICR data and image data sent from the hybrid processing apparatus 1 to the host device 30 is stored in a hard disk or other storage device 30b as digital data linked to the specified data ID as a result of the first process shown in FIG. 9. The host device 30 can thus read the MICR data and image data matching the data ID of the desired slip P from the storage device 30b as needed for presentation and verification on a display, for example.

The second process shown in FIG. 10 likewise sequentially executes the single-pass multiple-reading command, the MICR data transmission command, and the image data transmission command, and adds an error handling process. The host device 30 first sends the single-pass multiple-reading command to the hybrid processing apparatus 1 at a specific time (step S201).

When the single-pass multiple-reading command is received, the hybrid processing apparatus 1 runs the single-pass multiple-reading process shown in FIG. 5, and the host device 30 thus receives the read result returned from the hybrid processing apparatus 1 (step S202).

The parameters added to the single-pass multiple-reading command in steps S201 and S202 are the same as the parameters described in steps S101 and S102 in FIG. 9.

If the magnetic reading process ended normally (step S203 returns yes) based on the MICR read result contained in the read result received in step S202, the host device 30 sends a MICR data transmission command to the hybrid processing apparatus 1 (step S204), and receives and sequentially stores the MICR data from the hybrid processing apparatus 1 in storage device 30b (step S205) as described in steps S104 and S105 in FIG. 9.

However, if the magnetic reading process ended in error (step S203 returns no) based on the MICR read result contained in the read result received in step S202, the host device 30 sends the MICR data transmission command (step S206), and runs an error handling process (step S207).

Because the host device 30 knows in steps S206 and S207 that an error occurred on the hybrid processing apparatus 1 during the MICR data reading process, the host device 30 runs an error handling process to report the error. The cause of the MICR read error can be determined by checking the status data sent to the host device 30 during the MICR data transmission process.

The error handling process executed in step S207 could, for example, present a specific message based on the status data on the display of the host device 30.

The process shown in FIG. 10 ends after step S207 without reading the slip P.

After step S205, the image data read result contained in the read result received in step S202 is checked. If the optical reading process ended normally (step S208 returns yes), the host device 30 sends an image data transmission command to the hybrid processing apparatus 1 (step S209) and thus receives and sequentially stores the image data from the hybrid processing apparatus 1 in storage device 30b (step S210) as described in steps S107 and S108 in FIG. 9.

However, if the optical reading process ended in error (step S208 returns no) based on the image data read result received in step S202, the image data transmission command is sent (step S211) and an error handling process is then run (step S211).

Because the host device 30 knows in steps S211 and S212 that an error occurred on the hybrid processing apparatus 1 during the image scanning process, the host device 30 runs an error handling process to report the error. The cause of the image scanning error can be determined by referencing the status data sent to the host device 30 during the image data transmission process.

The error handling process executed in step S212 could, for example, present a specific message based on the status data on the display of the host device 30.

As a result of the second process shown in FIG. 10, the MICR data and image data sent from the hybrid processing apparatus 1 to the host device 30 is stored in a hard disk or other storage device 30b as digital data linked to the specified data ID, and if an error occurred for some reason, the error status can be reliably determined. The host device 30 operator can then operate the hybrid processing apparatus 1 as needed to correct the cause of the error.

The error content indicated in steps S203 and S208 in FIG. 10 could include, for example, a problem with the slip P, the hybrid processing apparatus 1 cover being open, a malfunction of the MICR head 22, or an error storing data in the memory unit 12, 14. The error messages displayed in the error handling process are therefore preferably set according to the actual error content.

A document reading apparatus and a document reading processing system according to the foregoing embodiments of the invention can thus execute both a magnetic reading process and an optical reading process, and acquire both MICR data and image data, while a slip P is conveyed once through the transportation path 2 when the hybrid processing apparatus 1 receives a single-pass multiple-reading command from the host device 30. Operation of the document reading apparatus is thus simplified on the host device 30 side, processing time can be greatly shortened, and efficiency is improved.

Furthermore, by adding a parameter to the single-pass multiple-reading command to selectively specify the type of data reading process, and using the read result for error processing, a hybrid processing apparatus 1 can be provided as a document reading apparatus affording improved convenience and excellent ease of use for the user of the host device 30.

A document reading apparatus according to the present invention can thus easily link the optically scanned image data of a check with the magnetic ink character data read from the same check because the magnetic reading process and optical reading process are executed during a single pass through the transportation path. More specifically, linking the scanned image data to the magnetic ink character data is not easy with a conventional device, and the image of a previously scanned check could be erroneously linked to the magnetic ink character data read from a check processed therebefore or thereafter. Because the link between the optical image data and magnetic ink character data is unmistakable with the present invention, however, image data and magnetic ink character data can be easily saved to the same file and transferred to the host computer.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A document reading processing system having a document reading apparatus for reading a slip on which magnetic ink characters are printed, the document reading apparatus being connected via a network to a host device for operating the document reading apparatus, wherein:

the document reading apparatus comprises
   a transportation unit that conveys the slip through a transportation path;
   a magnetic reading unit that magnetically reads the printed magnetic ink characters from the slip in the transportation path and outputs magnetic ink character recognition (MICR) data;
   an optical reading unit that optically reads an image of the slip in the transportation path and outputs image data; and
   a control unit that controls the transportation unit, the magnetic reading unit, and the optical reading unit, according to a command from the host device; and the host device comprises
   a command unit that instructs the document reading apparatus to magnetically read magnetic ink characters and optically read an image from a specific slip during a single pass of the slip through the transportation path, and to transmit a read result to the host device; and
a read data storage unit that stores MICR and image data transmitted from the document reading apparatus correlated to the specific slip that was read; and
the control unit of the document reading apparatus interprets control commands received from the host device and controls operation according to the interpreted commands; and the command unit of the host device sends as control commands to the document reading apparatus a single-pass multiple-reading command instructing execution of both magnetic reading and optical reading in a single pass of the slip through the transportation path, a magnetically read data transmission command instructing transmission of the MICR data to the host, and an image data transmission command instructing transmission of the image data to the host; and wherein the command unit of the host device adds to the single-pass multiple-reading command a parameter for selectively specifying magnetic reading or optical reading as the type of reading of the slip during the single pass through the transportation path; and the control unit of the document reading apparatus selectively executes only the type of reading specified by the parameter in the single-pass multiple-reading command.

2. The document reading processing system described in claim 1, wherein the control unit of the document reading apparatus generates data for identifying whether the magnetic reading and optical reading ended normally or in error as the read result of the single-pass multiple-reading, and returns the read result to the host device that sent the single-pass multiple-reading command.

3. A document reading processing system having a document reading apparatus for reading a slip on which magnetic ink characters are printed, the document reading apparatus being connected via a network to a host device for operating the document reading apparatus, wherein:

the document reading apparatus comprises
   a transportation unit that conveys the slip through a transportation path;
   a magnetic reading unit that magnetically reads the printed magnetic ink characters from the slip in the transportation path and outputs magnetic ink character recognition (MICR) data;
   an optical reading unit that optically reads an image of the slip in the transportation path and outputs image data; and
   a control unit that controls the transportation unit, the magnetic reading unit, and the optical reading unit, according to a command from the host device; and the host device comprises
   a command unit that instructs the document reading apparatus to magnetically read magnetic ink characters and optically read an image from a specific slip during a single pass of the slip through the transportation path, and to transmit a read result to the host device; and
a read data storage unit that stores MICR and image data transmitted from the document reading apparatus correlated to the specific slip that was and the control unit of the document reading apparatus interprets control commands received from the host device and controls operation according to the interpreted commands; and the command unit of the host device sends as control commands to the document reading apparatus a single-pass multiple-reading command instructing execution of both magnetic reading and optical reading in a single pass of the slip through the transportation path, a magnetically read data transmission command instructing transmission of the MICR data to the host, and an image data transmission command instructing transmission of the image data to the host; and wherein the optical reading unit of the document reading apparatus has a first optical reading unit that reads a front side of the slip and outputs front image data, and a second optical reading unit that reads a back side of the slip and outputs back image data;

the host device adds an image parameter to the image data transmission command for selectively specifying whether image data for the front or image data for the back of the slip is to be read; and the control unit of the document reading apparatus selectively transmits only image data for the side specified by said image parameter in the image data transmission process.

4. The document reading processing system described in claim 3, wherein the control unit of the document reading apparatus generates data for identifying whether the magnetic reading and optical reading ended normally or in error as the read result of the single-pass multiple-reading, and returns the read result to the host device that sent the single-pass multiple-reading command.

5. The document reading processing system described in claim 4, wherein the command unit of the host device sends the magnetically read data transmission command or image data transmission command to the document reading apparatus only when the reading is determined to have ended normally based on the returned read result.

6. The document reading processing system described in claim 4, wherein the host device runs an error process when the reading is determined to have ended in error based on the returned read result.

7. The document reading processing system described in claim 6, wherein the control unit of the document reading apparatus returns status data to the host device in the magnetically read data transmission process when the magnetic reading generates an error and ends processing for a slip, the status data indicating a cause of the error, and
   the host device runs an error handling process according to the content of the received status data.

8. A document reading apparatus for reading a slip on which magnetic ink characters are printed, comprising:
   a transportation unit that conveys the slip through a transportation path;
   a magnetic reading unit that magnetically reads the printed magnetic ink characters from the slip in the transportation path and outputs magnetic ink character recognition (MICR) data;
   an optical reading unit that optically reads an image of the slip in the transportation path and outputs image data; and
   a control unit that interprets an input control command, and based on the interpreted control command, controls the transportation unit, the magnetic reading unit, and the optical reading unit;
   the control command containing a single-pass multiple-reading command to magnetically read magnetic ink characters and optically read an image from a specific slip during a single pass of the slip through the transportation path; and wherein a magnetically read data transmission command instructing execution of a magnetically read data transmission process for transferring magnetically read data from the specific slip, and an image data transmission command instructing execution of an image data transmission process for transferring image data read from the specific slip are control commands interpreted by the control unit; and wherein a parameter for selectively specifying magnetic reading or optical reading as the type of reading of the slip during the single pass through the transportation path is added to the single-pass multiple-reading command; and the control unit selectively executes only the type of reading specified by the parameter in the single-pass multiple-reading command.

9. The document reading apparatus as described in claim 8, wherein the control unit generates and outputs data for identifying whether the magnetic reading and optical reading process ended normally or in error as a read result of the single-pass multiple-reading.

10. The document reading apparatus as described in claim 8, wherein the optical reading unit of the document reading apparatus contains a first optical reading unit that reads a front side of the slip and outputs front image data, and a second optical reading unit that reads a back side of the slip and outputs back image data.

11. The document reading apparatus as described in claim 8, wherein the control unit generates data for identifying whether the magnetic reading and optical reading ended normally or in error as the read result of the single-pass multiple-reading process, and returns the read result to a host device that sent the single-pass multiple-reading command.

12. The document reading apparatus as described in claim 8, wherein the control unit returns status data to a host device in the magnetically read data transmission process when the magnetic reading generates an error and ends processing for a specified slip, the status data indicating a cause of the error, and returns status data to the host device in the image data transmission process when the optical reading generates an error and ends processing for a specified slip, the status data indicating a cause of the error.

13. A hybrid processing apparatus comprising a document reading apparatus as described in claim 8, and a printing unit including a print head that prints on the slip, wherein the control unit controls a printing operation of the printing unit based on a command from a host device.

14. A document reading processing method for reading a slip on which magnetic ink characters are printed, comprising:

receiving a single-pass multiple-reading command from a host device;

interpreting the single-pass multiple -reading command; and in response to the single-pass multiple-reading command, magnetically reading the printed magnetic ink characters from the slip and optically reading an image of the slip in a single pass of the slip through a transportation path, and outputting a read result; and wherein when a parameter added to the single-pass multiple-reading command is determined to be a parameter for selectively specifying magnetic reading or optical reading as the type of reading of the slip during the single pass through the transportation path, selectively executing only the type of reading specified by the parameter.

15. The document reading processing method as described in claim 14, further comprising a step of generating and outputting data for identifying whether the magnetic reading and optical reading ended normally or in error as the read result of the single-pass multiple-reading command.

16. A document reading processing system for reading a slip on which magnetic ink characters are printed, comprising:

a magnetic reading unit that magnetically reads the printed magnetic ink characters from the slip in a transportation path and outputs magnetic ink character recognition (MICR) data;

an optical reading unit that optically reads an image of the slip in the transportation path and outputs image data; and a control unit that:

controls the magnetic reading unit, and the optical reading unit, according to a command from a host device;

receives a single-pass multiple-reading command from the host device;

interprets the single-pass multiple-reading command; and in response to the single-pass multiple-reading command, controls the magnetic reading unit and the optical reading unit to, respectively, magnetically read the printed magnetic ink characters from the slip and optically read an image of the slip in a single pass of the slip through the transportation path, and outputs a read result; and wherein when a parameter added to the single-pass multiple-reading command is determined to be a parameter for selectively specifying magnetic reading or optical reading as the type of reading of the slip during the single pass through the transportation path, the control unit selectively executes only the type of reading specified by the parameter.

* * * * *

UNITED STATES PATENT AND TRADEMARK OFFICE
CERTIFICATE OF CORRECTION

PATENT NO. : 7,090,131 B2 Page 1 of 1
APPLICATION NO. : 11/055425
DATED : August 15, 2006
INVENTOR(S) : Atsushi Natsuno It is certified that error appears in the above-identified patent and that said Letters Patent is hereby corrected as shown below:

Column 15, line 53, insert --read-- after "was"

Column 17, line 46, change "multiple -reading" to --multiple-reading--

Signed and Sealed this

First Day of May, 2007

JON W. DUDAS
*Director of the United States Patent and Trademark Office*